(12) United States Patent
Binder et al.

(10) Patent No.: US 9,273,765 B2
(45) Date of Patent: Mar. 1, 2016

(54) CAMSHAFT WITH AN AXIALLY DISPLACEABLE CAM PACK

(75) Inventors: Thomas Binder, Feldkirch (AT); Peter Wiesner, Mauren (LI)

(73) Assignee: Thyssenkrupp Presta Teccenter AG, Eschen (LI)

( * ) Notice: Subject to any disclaimer, the term of this patent is extended or adjusted under 35 U.S.C. 154(b) by 90 days.

(21) Appl. No.: 14/130,143

(22) PCT Filed: Jun. 29, 2012

(86) PCT No.: PCT/EP2012/062693
§ 371 (c)(1),
(2), (4) Date: Jan. 30, 2014

(87) PCT Pub. No.: WO2013/001060
PCT Pub. Date: Jan. 3, 2013

(65) Prior Publication Data
US 2014/0137826 A1    May 22, 2014

(30) Foreign Application Priority Data
Jun. 30, 2011   (DE) .......................... 10 2011 051 480

(51) Int. Cl.
*F01L 1/34* (2006.01)
*F16H 25/10* (2006.01)
(Continued)

(52) U.S. Cl.
CPC .............. *F16H 25/10* (2013.01); *B21D 53/845* (2013.01); *B22D 19/00* (2013.01); *F01L 1/047* (2013.01); *F01L 1/34* (2013.01); *F16H 25/08* (2013.01); *F16H 53/025* (2013.01); *F01L 2001/0473* (2013.01); *F01L 2013/0052* (2013.01); *Y10T29/49293* (2015.01); *Y10T 74/2101* (2015.01); *Y10T 74/2102* (2015.01)

(58) Field of Classification Search
CPC ...... B21D 53/845; B22D 19/00; F16H 25/10; F16H 25/08; F16H 53/025; F01L 1/34; F01L 2001/0473; F01L 2013/0052
USPC ....................................................... 123/90.16
See application file for complete search history.

(56) References Cited

U.S. PATENT DOCUMENTS

| 5,041,253 A | 8/1991 | Husted |
| 7,472,671 B2 * | 1/2009 | Elendt et al. ................. 123/90.6 |

(Continued)

FOREIGN PATENT DOCUMENTS

| CH | 694277 A5 | 10/2004 |
| DE | 4004505 A1 | 8/1991 |

(Continued)

*Primary Examiner* — Zelalem Eshete
(74) *Attorney, Agent, or Firm* — Laurence A. Greenberg; Werner H. Stemer; Ralph E. Locher

(57) ABSTRACT

A camshaft includes a carrier shaft to be mounted rotatably in a shaft axis and at least one cam pack axially displaceable on the carrier shaft. The cam pack includes at least two cams and at least one adjusting member for axial adjustment of the cam pack. The cams and adjusting member are interconnected in an axially adjacent configuration by an integrally molded body. The body is integrally molded on at least one cam and the adjusting member by an original molding process and a composite structure is formed by the integrally molded body. The composite structure can be mounted in a direct configuration on the carrier shaft to be axially displaceable thereon. The cams and the adjusting member include inner toothing engaging in an axially displaceable manner with outer toothing of the carrier shaft. A cam pack and a method for producing a camshaft are also provided.

19 Claims, 5 Drawing Sheets

(51) Int. Cl.
    *B21D 53/84*     (2006.01)
    *F01L 1/047*     (2006.01)
    *F16H 53/02*     (2006.01)
    *B22D 19/00*     (2006.01)
    *F16H 25/08*     (2006.01)
    *F01L 13/00*     (2006.01)

(56) References Cited

U.S. PATENT DOCUMENTS 7,513,232 B2   4/2009   Schneider

2006/0266492 A1   11/2006   Wu
2013/0000442 A1   1/2013   Wiesner et al.

FOREIGN PATENT DOCUMENTS

| | | |
|---|---|---|
| DE | 102004009074 B3 | 7/2005 |
| DE | 102009022657 A1 | 1/2011 |
| DE | 102009052222 A1 | 5/2011 |
| DE | 102010004591 A1 | 7/2011 |
| DE | 102010060766 A1 | 5/2012 |
| EP | 1754913 A2 | 2/2007 |
| JP | 5639356 S | 4/1981 |
| WO | 2011072782 A1 | 6/2011 |

* cited by examiner

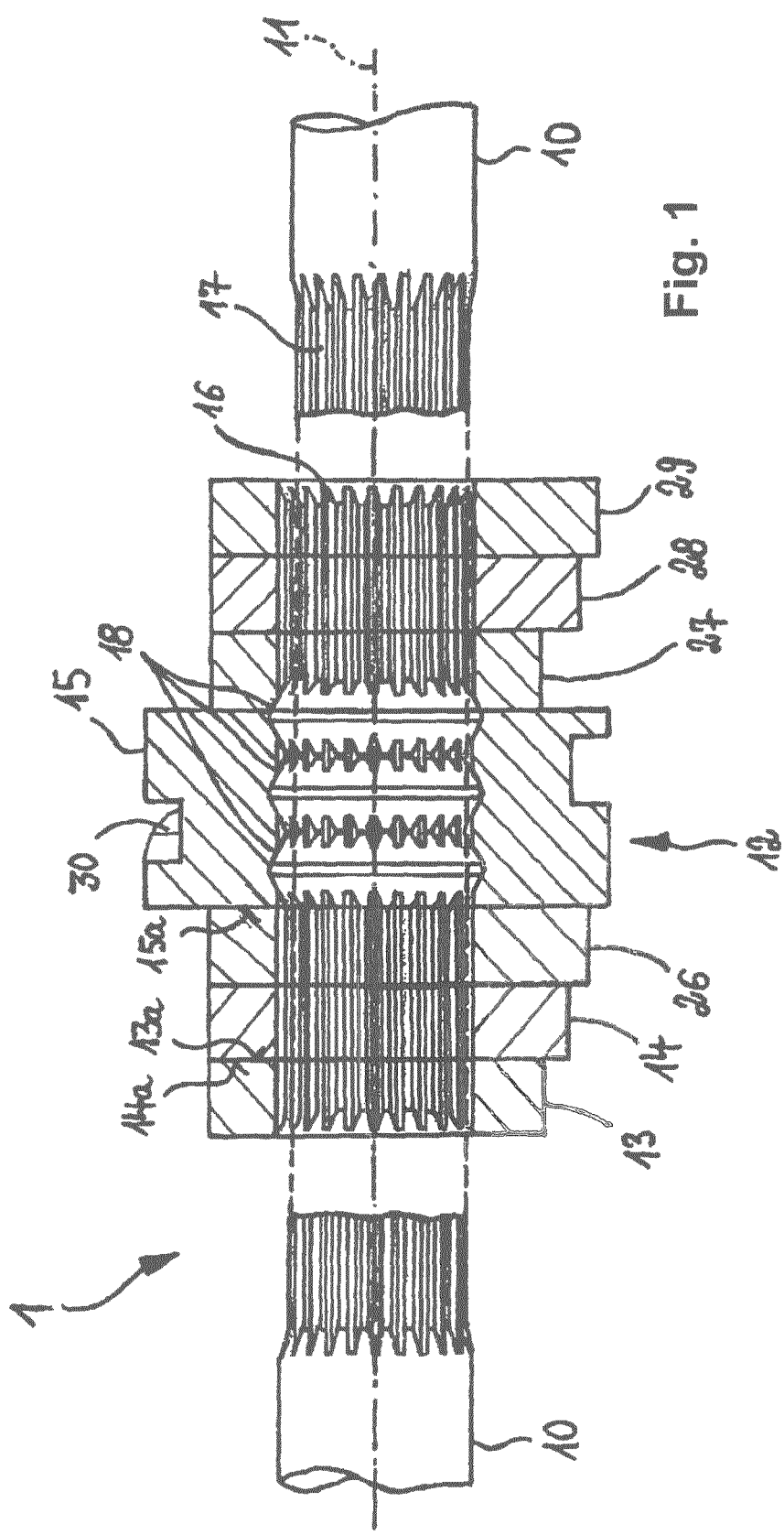

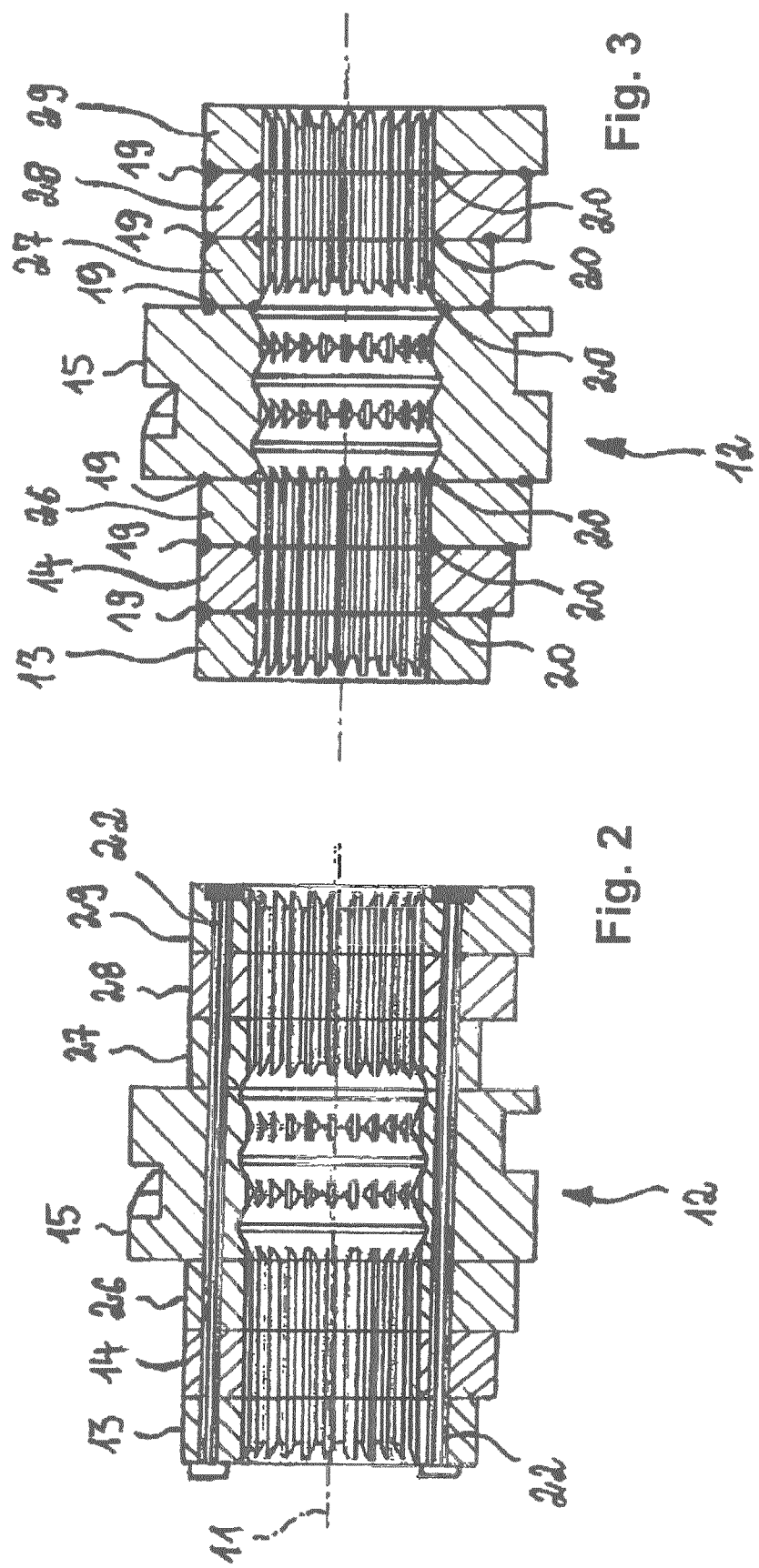

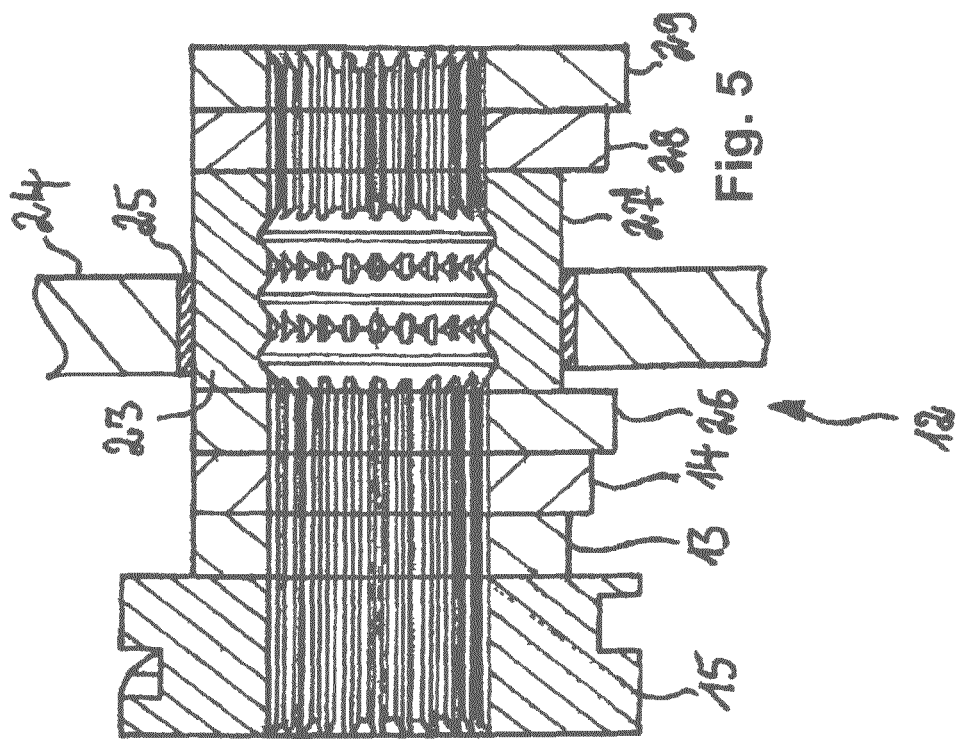
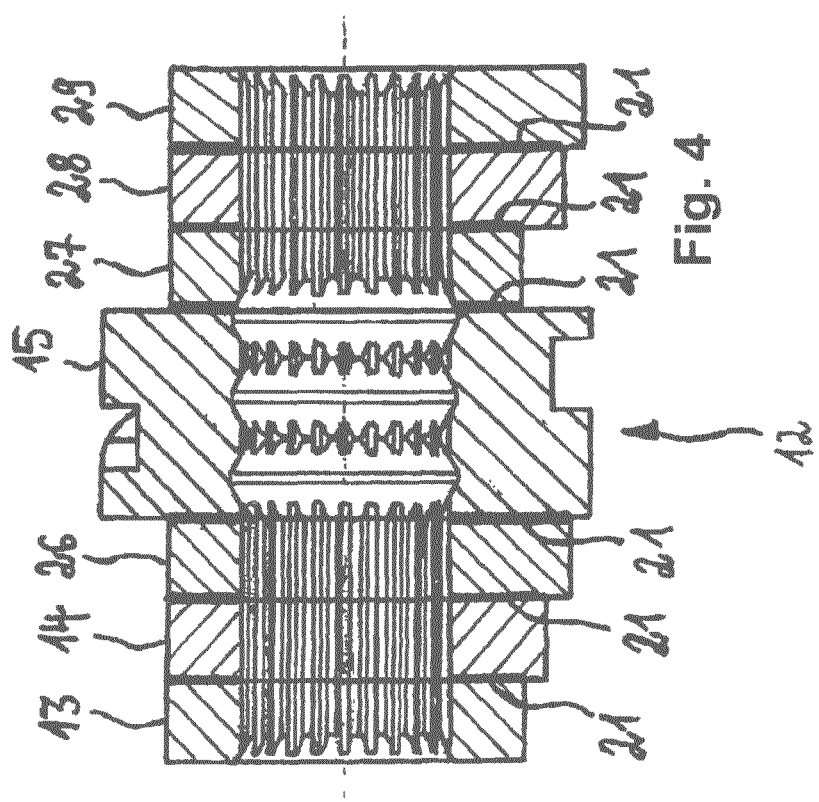

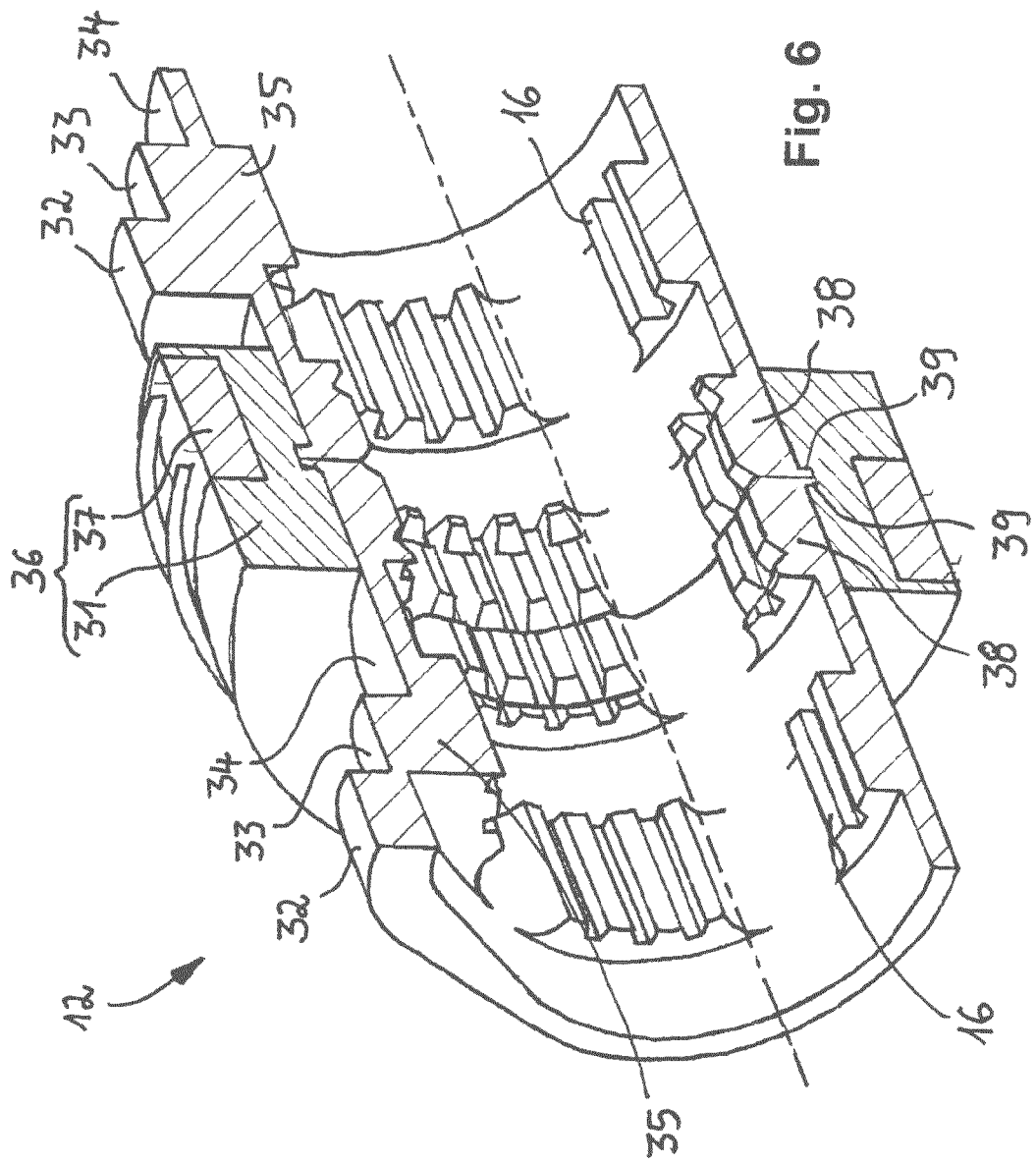

CAMSHAFT WITH AN AXIALLY DISPLACEABLE CAM PACK

BACKGROUND OF THE INVENTION

Field of the Invention

The invention relates to a camshaft with a carrier shaft which can be mounted rotatable in a shaft axis, wherein at least one cam pack is disposed axially displaceable on the carrier shaft, and wherein the cam pack comprises at least two cams and at least one adjusting member for the axial adjustment of the cam pack.

Such camshafts are used for internal combustion engines, which can be operated with an adjustable valve lift or with adjustable valve control times. The valves of the internal combustion engine are controlled by means of cam packs, which are disposed axially displaceable on the rotating carrier shaft. The valves can be controlled with different cams by the axial displacement of the cam pack on the carrier shaft, wherein the different cams can have different cam shapes. The cam lobes can be more or less geometrically pronounced or the position of the cam lobes can be varied relative to one another in the circumferential direction. Cams are also known that are constituted as zero-lift cams.

Cam packs comprise a plurality of cams, wherein at least one adjusting member is a component of the cam pack, by means of which the axial displacement is introduced into the cam pack.

There is known from DE 10 2009 022 657 A1 a camshaft with a carrier shaft, which can be mounted rotatable in the shaft axis in order to be operated in an internal combustion engine. Disposed on the carrier shaft is a cam pack, which is constituted for example by four cams. The cam pack comprises a carrier tube, which is disposed axially displaceable on the carrier shaft by means of an inner toothing and an outer toothing, so that the rotary motion of the carrier shaft is transmitted via a geometrical form-fit connection to the carrier tube. A plurality of cams is disposed on the carrier tube, so that the cam pack comprises four cams with two different cam contours. For the axial displacement of the cam pack, the carrier tube comprises axial stops, in which curved paths are introduced on the external periphery, said curved paths being able to cooperate with a transmission element.

DE 10 2004 011 586 A1 shows a further camshaft with a carrier shaft, and a carrier tube is shown which is constituted in one piece with a plurality of cams. The carrier tube comprises an inner toothing, which engages with an outer toothing of the carrier shaft in order to dispose the cam pack in an axially displaceable manner on the carrier shaft, and at the same time to produce a rotary transmission of the carrier shaft to the cam pack by means of a geometrical form-fit connection. The carrier tube comprises a bearing element between the cam contours in order to mount the cam pack rotatable in a bearing block, which can for example be a component of the cylinder head.

The camshafts according to the prior art disadvantageously comprise cam packs which necessitate a carrier tube in an assembled variant in order to combine various control elements and adjusting members with a cam pack, or which have to be produced in solid form. The carrier tube serves for the mounting on the carrier shaft and comprises the necessary inner toothing which can engage with the outer toothing on the carrier shaft. Disadvantageously, an expensive design arises due to the use of a carrier tube for mounting the cams and adjusting members, and the cams have to be disposed with a necessary jointing technique on the carrier tube. If the carrier tube and the cams and also, for example, the adjusting member are constituted as a whole in one piece, a component arises which is expensive to produce and on which a large number of processing operations have to be carried out. However, it is technically advantageous to be able to carry out individually both the machining and heat treatment of various elements of the cam pack.

BRIEF SUMMARY OF THE INVENTION

The object of the present invention consists in providing a camshaft with a cam pack, which overcomes the aforementioned drawbacks of the prior art and has a simple structure, wherein the various elements of the cam pack can also be machined and heat-treated individually.

This object is solved proceeding from a camshaft with a carrier shaft which can be mounted rotatably in a shaft axis, wherein at least one cam pack or package is disposed axially displaceably on the carrier shaft and wherein the cam pack includes at least two cams and at least one adjusting member for the axial adjustment of the cam pack. The cams and the at least one adjusting member are connected to one another in an axially adjacent configuration by an integrally molded body. The body is integrally molded on at least one cam and the adjusting member by an original molding process and a composite structure is formed by the integrally molded body. The composite structure is able to be mounted in a direct configuration on the carrier shaft so as to be axially displaceable on the latter. Advantageous developments of the invention are given in the dependent claims.

The invention includes the technical teaching that the cams and the at least one adjusting member are connected to one another in an axially adjacent arrangement by means of an integrally moulded body, wherein the body is integrally moulded on at least one cam and the adjusting member by an original moulding process and wherein a composite structure is formed by means of the integrally moulded body, said composite structure being able to be mounted in a direct arrangement on the carrier shaft so as to be axially displaceable on the latter, wherein the cams and the adjusting member comprise an inner toothing which engages in an axially displaceable manner with an outer toothing of the carrier shaft.

The invention proceeds from the idea of connecting the individual control elements of the cam pack directly to one another in order to constitute the cam pack without the use of a carrier tube. As a result of the direct connection of the cams and of the at least one adjusting member to the cams disposed adjacent to the latter, in the general idea of the invention also each element participating in a cam pack, the use of a carrier tube becomes unnecessary, and the cams and the at least one adjusting member can be disposed axially displaceable directly on the carrier shaft. As a result of the direct connection of the cams to one another and of the adjusting member to the cams disposed adjacent to the latter, a composite structure of individual elements is created which can be machined individually before being connected jointly to one another. After the composite structure comprising the cams and the adjusting member has being created, the latter can be disposed directly on the carrier shaft without further use of a carrier tube or any other element.

In order to produce the composite structure, at least one and preferably a plurality of cams and the adjusting member are connected to one another, i.e. for example cast with one another, by means of the integrally moulded body. For this purpose, the body can be integrally moulded on the at least one cam and the adjusting member by means of an original moulding process, as a result of which the integrally moulded body forms a stable, mechanically loadable connection between the cam and the adjusting member.

The body can be integrally cast on the at least one cam and on the adjusting member in an injection moulding process or in a die-casting process, wherein the material of the body preferably comprises aluminum, magnesium or plastic. For example, if the material comprises plastic, the body can be injection moulded on the at least one cam and the adjusting member in an injection moulding process. If the material comprises magnesium and/or aluminum, a metal die-casting process for example can be used. As an alternative to a casting method, the integrally moulded body can also be integrally moulded on the at least one cam and the adjusting member in a sintering process, e.g. from a granulate or a powder.

Within the scope of the invention, provision can also be made such that, for example, only the connection between two or more of cams is produced with the integrally moulded body.

The invention offers the particular advantage of constituting the cams and the adjusting member with an inner toothing, which can engage in an axially displaceable manner with an outer toothing of the carrier shaft and can at the same time transmit torques in the circumferential direction. The inner toothing is preferably introduced directly into the cams and/or into the adjusting member in order to dispose the cam pack already formed with the cams and/or the adjusting member in an axially movable and rotation-transmitting manner on the carrier shaft. As a further advantage, it is possible for example for only outer elements, for example a first outer cam and a mutually opposite second outer cam, to be constituted with an inner toothing, which can engage with a, for example, continuous outer toothing on the carrier shaft. The advantage is thus obtained that only two elements of the cam pack have to be constituted with an inner toothing, which preferably terminate the cam pack on the outside. Further elements of the cam pack, which are disposed between the elements disposed on the outside with the inner toothing, can optionally comprise further inner toothings.

As a further advantage, at least one latching groove can be introduced into at least one of the cams, but preferably in the adjusting member, said latching groove being able to cooperate with a latching means for the axial latching of the cam pack, said latching means being disposed in the carrier shaft. The latching means can for example be a spring-loaded ball, which is pressed into the latching grooves. Defined axial positions of the cam pack can thus be defined by the axial adjustment, wherein the number of latching grooves preferably corresponds to the number of cams of differing cam contour. The latching grooves can be introduced particular advantageously into elements of the cam pack that are not constituted with an inner toothing.

The cams and the adjusting member can be connected to one another at least over partial regions of their respective end faces. The end faces can be formed by plane faces, with which the shaft axis forms a surface normal. Once the cams and the adjusting member are brought flat one against the other in an axially adjacent arrangement, the connection can be made between the cams and/or the adjusting member. The connections can be constituted particularly advantageously as firmly bonded connections.

The firmly bonded connections between the cams and the at least one adjusting member and the cams adjacent thereto can be carried out by means of weld joints, and weld joints can be disposed for example on the outer periphery and/or on the inner periphery. The weld joints can be produced for example with a laser beam welding method or with an electron beam welding method, in order to minimize the thermally influenced material zone in the cams and/or in the adjusting member. Furthermore, the thermal distortion of the pack arrangement of the cam pack can be minimized by these welding methods. The weld joint can be produced particularly advantageously with the formation of a vapour capillary, in order to produce a particularly deep weld between the end faces of the cams and/or the adjusting member, so that the weld joint is capable of withstanding particularly high mechanical loads.

According to a possible embodiment of the invention, the firmly bonded connections between the cams and the at least one adjusting member can be carried out by means of solder joints and/or adhesive joints. In principle, finish machining of the functional surfaces of the cams and/or the adjusting member can take place after the firmly bonded connections are have been produced between the cams and/or the adjusting member.

As a further advantage, the connections between the cams to one another and the adjusting member to the cams disposed adjacent thereto can be constituted by at least one and preferably a plurality of tie rods distributed uniformly on the periphery of the cam pack, said tie rod or rods extending through the cams and the adjusting member. The tie rods can be constituted by threaded bolts or suchlike and can take up a tensile stress after arrangement in the cam pack. The cams and the adjusting member are consequently pressed axially against one another in order to form a mechanically loadable composite structure comprising the cams and the adjusting member. Alternatively, it is also conceivable to connect the cams to one another and the adjusting member to its adjacent cams by means of one or more rivet joints. As a further advantage, the cams and the adjusting member can for example be pinned together, or form-fit geometries can be provided on the end faces of the cams and the adjusting member in order then to pass the tie rods through the cams and the adjusting member and thus to place them under tensile stress.

As a further possible embodiment of the invention, the connections of the cams and of the at least one adjusting member to its adjacent cams can be constituted in each case by at least one jointing element acting in a form-fit manner which is preferably disposed on the cams and/or at least one adjusting member or is constituted between the end faces. The jointing elements acting in a form-fit manner can be constituted in one piece with the cams and/or the adjusting member or can even be moulded onto the latter. For example, threaded joints, bayonet joints, undercut joints or other joints can be provided between the cams and/or the adjusting member, or jointing elements such as slot nuts or suchlike are provided. In principle, any possible connection embodiment can be provided between the cams and/or the adjusting member in order to connect the latter to one another in a mechanically loadable manner. The connection of the cams and/or the adjusting member should preferably be able to be produced free from play, and the connection should maintain the rotational position of the elements around the common shaft axis.

According to a further advantageous embodiment, the cam pack can comprise at least one bearing element, which is preferably constituted for the formation of a zero-lift cam. A zero-lift cam comprises a cylindrical lateral surface, wherein the bearing element can have an axial width which enables both the bearing of the cam pack by means of the bearing element as well as the simultaneous active connection of the bearing element to a tappet of the valve control. The bearing element can also be connected by means of the integrally moulded body to at least one cam and/or to the adjusting member.

According to an advantageous development of the camshaft according to the invention, a plurality of cams can comprise at least one multiple cam element, wherein at least one multiple cam element is connected to the adjusting member by means of the integrally moulded body in an axially adjacent arrangement with respect to the adjusting member, and the multiple cam element comprises a plurality of cam contours preferably differing from one another. The multiple cam elements can comprise a through-bore, in which the inner toothing is introduced. Consequently, a plurality of cams can be provided uniformly and comprising one component as a result of the multiple cam elements for the production of the cam pack. The integrally moulded body can be integrally moulded, in particular integrally cast, integrally injected or integrally moulded in the die-casting process, between the multiple cam elements and the adjusting member, so that a connection arises between the multiple cam elements and the adjusting member.

According to a further advantageous embodiment, the adjusting member can be constituted at least in two parts, wherein a first part of the adjusting member is constituted by a control contour element and a second part of the adjusting member is constituted by the integrally moulded body. Introduced in the control contour element is a control path, which cooperates with an external element in order to displace the cam pack axially along the shaft axis on the carrier shaft.

The multiple cam element can comprise a jointing section, wherein at least one jointing section of a multiple cam element is introduced at least partially into the control contour element constituted ring-shaped, and wherein the integrally moulded body connects the jointing section and the control contour element to one another. In particular, the material of the integrally moulded body fills the radial gap between the jointing section of the multiple cam element and the inner side of the control contour element. The integrally moulded body can be constituted wider in the direction of the shaft axis than the control contour element, so that the control contour element is embedded in the integrally cast body and is thus accommodated by the latter. At the same time, a mechanically loadable connection between the control contour element and the multiple cam element arises as a result of the integrally moulded body, so that the integrally moulded body forms both a part of the adjusting member and a means for connecting the adjusting member to the multiple cam element. In the same way, the integrally moulded body can also form a part of the adjusting member, and can also connect the control contour element to the cam body.

A form-fit shoulder can be disposed on the jointing section of the multiple cam element, so that a form-fit connection between the adjusting member and the multiple cam element is formed with the integrally moulded body at least in the direction of the shaft axis. The form-fit shoulder can for example constitute a collar at the end of the jointing section of the multiple cam element, said collar being cast around or encapsulated by the integrally moulded body.

In addition or as an alternative, a number of holes can be introduced into the jointing section, in which holes the material of the integrally moulded body engages in a form-fit manner. A form-fit connection can thus be produced between the integrally moulded body and the jointing section, said connection being capable of withstanding high mechanical loads.

An advantageously constituted cam pack can be formed especially when a first multiple cam element with a first to jointing section is disposed on a first side of a control contour element and a second multiple cam element with a second jointing section is disposed on a second, opposite side of the control contour element, so that the two multiple cam elements are connected to one another by the integrally moulded body, and wherein in particular the control contour element is embedded in the integrally moulded body for the formation of the adjusting member. The integrally moulded body thus forms a connecting body between the adjusting member and a first and a second multiple cam element. The jointing sections of the mutually opposite multiple cam elements can abut against one another with their end faces, and form-fit shoulders are integrally moulded at the end on the jointing sections, said form-fit shoulders thus forming a common collar, which is surrounded by the material of the integrally moulded body and thus forms a connection in a form-fit manner between the two multiple cam elements.

The invention further relates to a cam pack comprising at least two cams and at least one adjusting member for the axial adjustment of the cam pack on a carrier shaft, wherein the cams and the at least one adjusting member are connected to one another in an axially adjacent arrangement by means of an integrally moulded body, wherein the body is integrally moulded on at least one cam and the adjusting member by an original moulding process and wherein a composite structure is formed by the integrally moulded body, said composite structure being constituted for direct arrangement on the carrier shaft, wherein the cams and the adjusting member comprise an inner toothing, which can be engaged in an axially displaceable manner with an outer toothing of the carrier shaft. The advantages and embodiments of the aforementioned camshaft with a corresponding cam pack are also taken into account for the generic cam pack.

The invention further relates to a method for producing a camshaft with a carrier shaft which can be mounted rotatably in a shaft axis, wherein at least one cam pack is disposed axially displaceable on the carrier shaft and wherein the cam pack comprises at least two cams and at least one adjusting member for the axial adjustment of the cam pack, wherein according to the invention the method comprises at least the steps of the arrangement of at least two cams in a position adjacent to the adjusting member, the integral moulding of a body on the at least one cam and the adjusting member by means of an original moulding process, so that a composite structure comprising at least one cam and the adjusting member is formed and comprises the direct arrangement of the composite structure on the carrier shaft, wherein the cams and the adjusting member comprise an inner toothing, which is engaged in an axially displaceable manner with an outer toothing of the carrier shaft.

The method can be carried out by means of an original moulding tool, and the at least one cam and/or the at least one multiple cam element as well as the adjusting member are introduced into the original moulding tool in an axially adjacent arrangement with respect to one another. The introduced components can be fixed in their position in the original moulding tool, so that the latter already occupy a position which corresponds to the subsequent position for the formation of the cam pack. The material of the integrally moulded body can then be introduced into the original moulding tool, for example by an injection moulding process or a die-casting process. After hardening of the integrally moulded body, the composite structure thus formed can be removed from the original moulding tool. For example, finish machining of the components can then also take place. Thus, for example, provision can be made such that the cams are ground and polished in their assumed position in the composite structure of the cam pack in order to create a final cam contour.

Instead of an already complete adjusting member, the described method can be carried out with a control contour element, and the integrally moulded body forms beside the control contour element a further part for the completion of the adjusting member. As an alternative to individual cams, at least one multiple cam element can also be provided, and the multiple cam element is disposed in the original moulding tool in an axially adjacent arrangement with respect to the adjusting member or the control contour element, so that the material for forming the integrally moulded body is then added. Particularly advantageously, two multiple cam elements can comprise respective jointing sections, which are disposed in the original moulding tool pointing towards one another along a common shaft axis. An adjusting member and preferably a control contour element can also be introduced in the region of the jointing plane, in which the multiple cam elements point towards one another with their jointing sections and lie adjacent to one another with their end faces, so that the material for the formation of the integrally moulded body is then introduced, and preferably injected or cast, into the radial region between the approximately ring-shaped control contour element and the jointing sections of the multiple cam elements.

The method can further comprise the introduction of an inner toothing into the cams and/or into the adjusting member in order to engage in an axially displaceable manner with an outer toothing on the carrier shaft. The inner toothing is introduced directly into the material of the cams and/or of the adjusting member. According to a further method step, there is introduced into at least one cam and/or into the adjusting member at least one latching groove, which can cooperate with a latching means, which is disposed in the carrier shaft, for the axial latching of the cam pack.

According to a possible embodiment of the method according to the invention, the inner toothing can be introduced in each case individually into the cams and into the adjusting member, the cams and the adjusting member only being mutually jointed subsequently in an axially adjacent arrangement.

Alternatively, the cams and the adjusting member can be mutually jointed in an axially adjacent arrangement, the inner toothing only then being introduced into the cams and into the adjusting member. In the same way, the at least one latching groove can be introduced before or after the jointing of the cams and the adjusting member with one another.

BRIEF DESCRIPTION OF THE SEVERAL VIEWS OF THE DRAWING

Further features improving the invention are represented in greater detail below with the aid of the figures, together with the description of preferred examples of embodiment of the invention. In the figures:

FIG. 1 shows a cross-sectional view through a camshaft with a cam pack, which is constituted with the features of the present invention, FIG. 2 shows a cross-sectional view of a cam pack according to a first example of embodiment for the formation of the connections between the cams and the adjusting member, FIG. 3 shows a cross-sectional view of a cam pack according to a second example of embodiment for the formation of the connections between the cams and the adjusting member, FIG. 4 shows a cross-sectional view of a cam pack according to a further example of embodiment for the formation of the connections between the cams and the adjusting member, FIG. 5 shows a further example of embodiment of a cam pack, which comprises a bearing element for the mounting in a bearing, FIG. 6 shows a further example of embodiment of a cam pack, which comprises an integrally moulded body according to the invention

DESCRIPTION OF THE INVENTION

Figure 7:
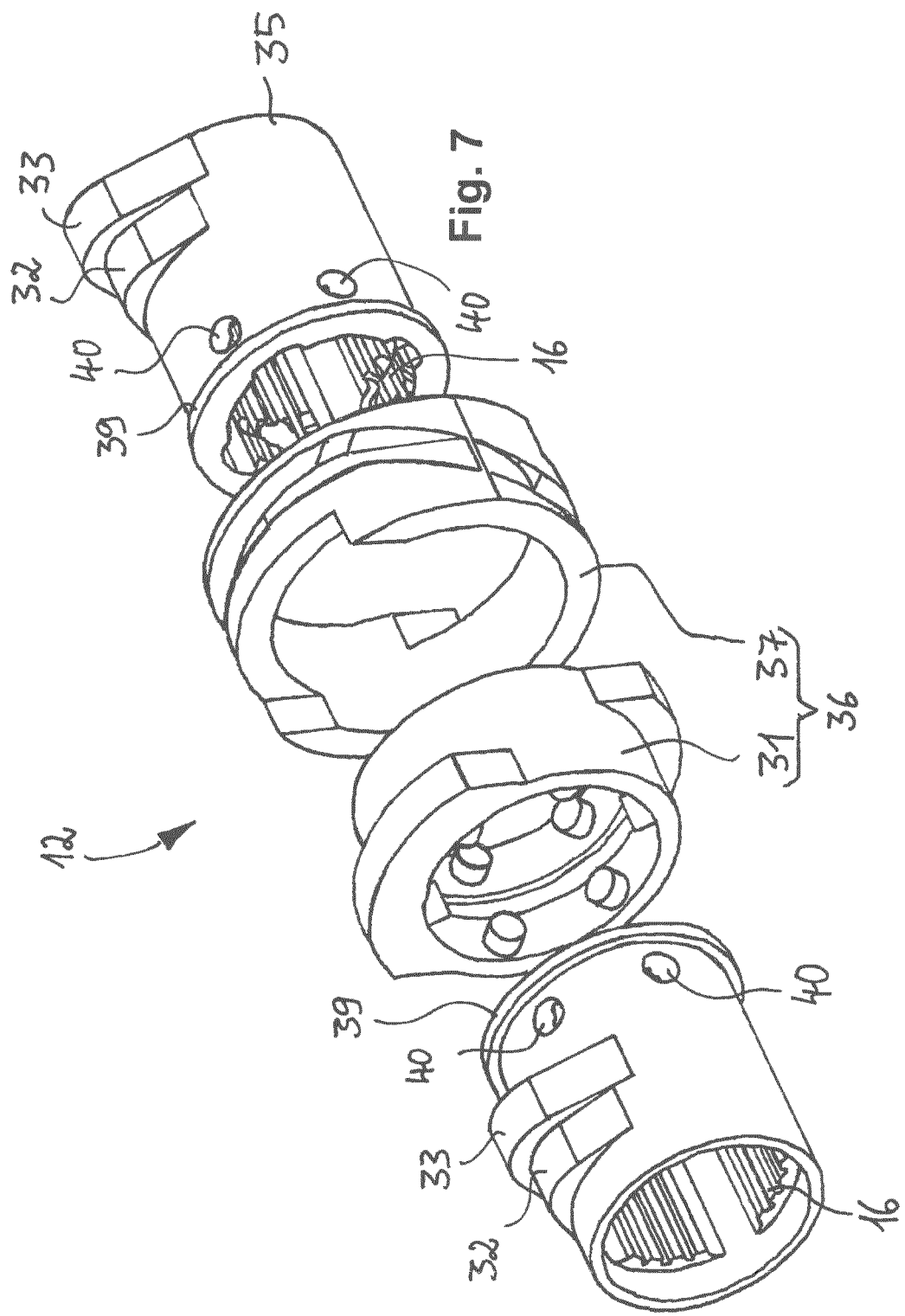
FIG. 7 shows the example of embodiment of the cam pack according to FIG. 6 in an exploded view.

FIG. 1 shows an example of embodiment of a camshaft 1 with a cam pack 12, which is constituted with the features of the present invention. Camshaft 1 comprises a carrier shaft 10, which is shown interrupted in the seating region of cam pack 12. Carrier shaft 10 can be mounted rotatably in a shaft axis 11, for example in the cylinder head of an internal combustion engine.

Cam pack 12 comprises for example six cams 13, 14, 26, 27, 28 and 29, wherein an adjusting member 15 is provided, and a groove guide 30 is introduced in adjusting member 15 on the outer periphery of the adjusting member 15. Cams 13, 14 and 26 are located on a first side of adjusting member 15, and cams 27, 28 and 29 are located on an opposite, second side of adjusting member 15. A through-bore, through which carrier shaft 10 is passed, extends through cams 13, 14, 26, 27, 28, 29 and through adjusting member 15. An inner toothing 16 is introduced in this through-bore formed by the individual components of cam pack 12, said inner toothing engaging with an outer toothing 17 on carrier shaft 10 in an axially displaceable and torque-transmitting manner. Outer toothing 17 of carrier shaft 10 is constituted wider in the direction of shaft axis 11 than the width of cam pack 12, and cam pack 12 can be adjusted axially in the direction of the shaft axis, whereby an adjusting element is guided in groove guide 30 of adjusting member 15. As a result of the form-fit connection of inner toothing 16 and outer toothing 17, a rotary motion of the carrier shaft 10 is at the same time transmitted to cam pack 12.

Cams 13, 14, 26, 27, 28, 29 and adjusting member 15 are connected to one another in an axially adjacent arrangement with one another, so that, as a result of the connection of these components of cam pack 12 via their respective end faces constituted in the axial direction, a composite structure is created which forms cam pack 12. According to the invention, this does not require a carrier tube on which the individual components such as cams 13, 14, 26, 27, 28, 29 and adjusting member 15 have to be disposed. Inner toothing 16 and latching grooves 18 can thus be introduced directly into cams 13, 14, 26, 27, 28, 29 and into adjusting member 15, wherein for example three latching grooves 18 are introduced on the inside into adjusting member 15, which are able to cooperate with a latching means for the axial latching of cam pack 12, said latching means being disposed in carrier shaft 10 in a manner not shown in detail.

Cams 13, 14, 26, 27, 28, 29 each have different cam contours, for example cams 13, 14, 26, 27, 28, 29 can have different cam lobes or the cam lobes are constituted at different angles around the circumference. As a result of the axial adjustability of cam pack 12, tappets having a fixed axial position can cooperate with different cams 13, 14, 26 or 27, 28, 29, in order for example to change the valve lift, but also for example to change the valve control times.

FIG. 2 shows a first example of embodiment for the formation of the composite structure of cams 13, 14, 26, 27, 28, 29 and adjusting member 15. The connection is constituted by tie rods 22, and by way of example two tie rods 22 are represented over the periphery of cam pack 12, wherein in particular more than two tie rods 22 can be provided, which are disposed uniformly distributed on the periphery of cam pack 12. Tie rods 22 extend parallel to shaft axis 11 through cams 13, 14, 26, 27, 28, 29 and adjusting member 15 and are placed under axial tensile stress. The components of cam pack 12 are thus pressed against one another at the end faces in order to form a mechanically loadable composite structure. Tie rods 22 can be constituted as screw elements or as dowel pins, in order to introduce a tensile stress into tie rods 22.

FIG. 3 shows a further example of embodiment for the formation of cam pack 12, wherein the connections between cams 13, 14, 26, 27, 28, 29 and adjusting member 15 are constituted by weld joints 19, 20. Weld joints 19 are constituted as weld joints on the outer periphery and weld joints 20 are constituted as weld joints on the inner periphery. Weld joints 19 and 20 constituted on the outer periphery and on the inner periphery are shown merely by way of example, wherein for example only weld joints 20 on the inner periphery may be sufficient to form a mechanically loadable composite structure of the components of cam pack 12. Weld joints 19 and 20 can be produced for example by laser beam welding procedures or by electron beam welding procedures, in order to minimise the thermal effect on cams 13, 14, 26, 27, 28, 29 and adjusting member 15.

FIG. 4 shows a further example of embodiment for the formation of cam pack 12, wherein cams 13, 14, 26, 27, 28, 29 are connected to one another and adjusting member 15 to adjacent cams 26, 27 by solder joints 21. Solder joints 21 can be prepared for example by soldering foils, which are disposed between the individual components of cam pack 12 and, after the arrangement of cams 13, 14, 26, 27, 28, 29 and adjusting member 15 in an axially adjacent arrangement with respect to one another, cam pack 12 thus prepared can be brought to the solder melting temperature in order to finish solder joints 21. As an alternative to shown solder joints 21, adhesive joints can be provided between the components of cam pack 12.

Finally, FIG. 5 shows a further embodiment of a cam pack 12 with an adjusting member 15 and cams 13, 14, 26, 27', 28, 29, wherein cam 27' is also constituted as a bearing element 23. The cam 27' is constituted as a zero-lift cam and has a cylindrical outer circumference. Besides the tapping—not shown in detail—by means of a tappet for the valve control, cam pack 12 is mounted in a bearing block 24, into which a bearing 25 is introduced. Cam 27' thus performs both as a zero-lift function for the valve control as well as the function for the bearing of cam pack 12. The connection between the components of cam pack 12 can be constituted according to the example of embodiment in FIG. 2, in FIG. 3 or in FIG. 4.

As a result, a cam pack 12 is created which can be constituted without the use of a carrier tube. Furthermore, the possibility remains of feeding the different components of cam pack 12 in each case individually to mechanical and/or thermal processing steps, the components only then being connected to one another to form a cam pack 12.

Inner toothing 16, which is introduced into cams 13, 14, 26, 27, 28, 29 and into adjusting member 15, can be introduced individually into the respective components before the creation of the jointing connections or inner toothing 16 is introduced into cam pack 12 when the jointing connections between the individual components have already been created.

FIG. 6 shows a cam pack 12 with which the features of the present invention are represented. Cam pack 12 has a structure comprising two multiple cam elements 35 and an adjusting member 36. Each of multiple cam elements 35 comprises cams 32, 33 and 34, and the two multiple cam elements 35 are disposed adjacent to one another at their end faces along a common shaft axis 11. Multiple cam elements 35 comprise on the inside inner toothings 16, which do not extend continuously over the entire circumference of the through-bore in multiple cam elements 35, but rather inner toothing 16 is constituted only over partial regions of the inner wall of multiple cam elements 35. It is also possible for multiple cam elements 35 to lie opposite one another with their end faces, but not to make contact, but rather to have an axial spacing from one another, as a result of which weight advantages are obtained.

Adjusting member 36 is constituted by a control contour element 37 made of a metallic material, which has a ring-shaped embodiment. Control contour element 37 surrounds jointing sections 38 integrally moulded on multiple cam elements 35, with which jointing sections multiple cam elements 35 lie adjacent to one another, so that jointing sections 38 extend roughly on the inside into control contour element 37. To complete adjusting member 36, the radial region between ring-shaped control contour element 37 and jointing sections 38 is filled with the material of a body 31 to be integrally moulded. The filling of the material can take place for example by means of a casting process in an original moulding tool, into which multiple cam elements 35 and control contour element 37 are introduced beforehand and positioned with respect to one another. The original moulding tool can comprise a tool mould with which the free surfaces of the integrally moulded body are defined.

After injection or casting of the material for the formation of integrally moulded body 31, a mechanically loadable, firm composite structure arises with multiple cam elements 35 and control contour element 37, by means of which composite structure cam pack 12 is formed in one part. In order to create a form-fit connection between jointing sections 38 of multiple cam elements 35 and the material of integrally moulded body 31, collar-shaped form-fit shoulders 39 are integrally moulded at the edge-side end of jointing sections 38, so that a geometrical form-fit connection between jointing sections 38 and integrally moulded body 31 is formed in the axial direction of shaft axis 11.

The representation shows, merely by way of example, the connection between an adjusting member 36 and two multiple cam elements 35, wherein only one multiple cam element 35 can be disposed with an adjusting member 36. In the same way, a connection between an adjusting member 15 and one or more cams 13, 14, 26, 27, 28, 29 can also be created with an integrally moulded body 31, as they are represented for example in FIG. 1.

FIG. 7 shows, in an exploded view, a cam pack 12 with two multiple cam elements 35 and a control contour element 37, which together with a part of integrally moulded body 31 forms adjusting member 36. Integrally moulded body 31 is represented detached, as a result of which the developing geometrical shape of body 31 can clearly be seen, without integrally moulded body 31 being assembled as an individual part. The example of embodiment shows multiple cam elements 35 with an inner toothing 16 and cams 32 and 33, which are located on the outer periphery of multiple cam elements 35. Multiple cam elements 35 also comprise holes 40, and if multiple cam elements 35 are located in a position adjacent to one another with their end faces, holes 40 lie in the inner region of control contour element 37. If the material of integrally moulded body 31 thus formed is then cast, the material of body 31 passes partially into holes 40, as a result of which a geometrical form-fit connection arises between body 31 and multiple cam elements 35. Likewise in this example of embodiment, form-fit shoulders 39 are shown on the end of multiple cam elements 35, in order to create a further geometrical form-fit connection between shoulders 39 and the material of body 31.

The invention is not limited in its implementation to the aforementioned preferred examples of embodiment. On the contrary, a number of variants are conceivable, which make use of the presented solution even with fundamentally different embodiments. All the features and/or advantages emerging from the claims, the description or the drawings, including structural details or spatial arrangements, may be essential to the invention both in themselves and as well as in the most varied combinations.

LIST OF REFERENCE NUMBERS 1 camshaft
10 carrier shaft
11 shaft axis
12 cam pack
13 cam, 13a end face
14 cam, 14a end face
15 adjusting member, 15a end face
16 inner toothing
17 outer toothing
18 latching groove
19 weld joint on the outer periphery
20 weld joint on the inner periphery
21 solder joint
22 tie rod
23 bearing element
24 bearing block
25 bearing
26 cam
27 cam
27' cam
28 cam
29 cam
30 groove guide
31 integrally moulded body
32 cam
33 cam
34 cam
35 multiple cam element
36 adjusting member
37 control contour element
38 jointing section
39 form-fit shoulder
40 hole

The invention claimed is:

1. A camshaft comprising:
a carrier shaft configured to be mounted for rotation along a shaft axis;
at least one cam pack configured to be axially displaced on said carrier shaft, said at least one cam pack including at least two cams and at least one adjusting member configured to axial adjust said at least one cam pack;
an integrally molded body configured to interconnect said cams and said at least one adjusting member in an axially adjacent configuration, said integrally molded body being integrally molded on at least one of said cams and said at least one adjusting member by an original molding process;
a composite structure formed by said integrally molded body, said composite structure configured to be mounted in a direct configuration on said carrier shaft and be axially displaceable on said carrier shaft; and
said carrier shaft having an outer toothing and said cams having an inner toothing engaging in an axially displaceable manner with said outer toothing.

2. The camshaft according to claim 1, wherein said integrally molded body is integrally cast as an injection molding or a die-casting on at least one of said cams and on said at least one adjusting member.

3. The camshaft according to claim 2, wherein said integrally molded body is formed of a material including aluminum, magnesium or plastic.

4. The camshaft according to claim 1, wherein said at least one cam pack includes at least one bearing element.

5. The camshaft according to claim 4, wherein said at least one bearing element is configured to form a zero-lift cam.

6. A camshaft comprising:
a carrier shaft configured to be mounted for rotation along a shaft axis;
at least one cam pack configured to be axially displaced on said carrier shaft, said at least one cam pack including at least two cams and at least one adjusting member configured to axial adjust said at least one cam pack;
an integrally molded body configured to interconnect said cams and said at least one adjusting member in an axially adjacent configuration, said integrally molded body being integrally molded on at least one of said cams and said at least one adjusting member by an original molding process;
a composite structure formed by said integrally molded body, said composite structure configured to be mounted in a direct configuration on said carrier shaft and be axially displaceable on said carrier shaft;
said carrier shaft having an outer toothing and said cams having an inner toothing engaging in an axially displaceable manner with said outer toothing; and
said cams and said at least one adjusting member having respective end faces and being connected to one another by connections at least over partial regions of said respective end faces.

7. The camshaft according to claim 6, wherein said connections are firmly bonded connections.

8. The camshaft according to claim 7, wherein said firmly bonded connections are weld joints, solder joints or adhesive joints.

9. The camshaft according to claim 8, wherein said weld joints are disposed on at least one of outer peripheries or inner peripheries of said cams and said at least one adjusting member.

10. A camshaft comprising:
a carrier shaft configured to be mounted for rotation along a shaft axis;
at least one cam pack configured to be axially displaced on said carrier shaft, said at least one cam pack including at least two cams and at least one adjusting member configured to axial adjust said at least one cam pack;
an integrally molded body configured to interconnect said cams and said at least one adjusting member in an axially adjacent configuration, said integrally molded body being integrally molded on at least one of said cams and said at least one adjusting member by an original molding process;
a plurality of said cams forming at least one multiple cam element, and said at least one multiple cam element being connected to said at least one adjusting member by said integrally molded body in an axially adjacent configuration with respect to said at least one adjusting member;
a composite structure formed by said integrally molded body, said composite structure configured to be mounted in a direct configuration on said carrier shaft and be axially displaceable on said carrier shaft;

said carrier shaft having an outer toothing and said cams having an inner toothing engaging in an axially displaceable manner with said outer toothing;

said at least one adjusting member having at least two parts including a first part formed by a control contour element and a second part formed by said integrally molded body; and said control contour element being ring-shaped, said at least one multiple cam element including at least one jointing section introduced at least partially into said ring-shaped control contour element, and said integrally molded body connecting said at least one jointing section and said control contour element to one another.

11. The camshaft according to claim 10, which further comprises a form-locking shoulder disposed on said at least one jointing section and forming a form-locking connection between said at least one adjusting member and said at least one multiple cam element with said integrally molded body, at least in direction of said shaft axis.

12. The camshaft according to claim 10, wherein said at least one jointing section has holes formed therein in which material of said integrally molded body engages in a form-locking manner.

13. The camshaft according to claim 10, wherein:

said at least one multiple cam element includes a first multiple cam element with a first jointing section disposed on a first side of said control contour element and a second multiple cam element with a second jointing section disposed on a second, opposite side of said control contour element; and said first and second multiple cam elements are connected to one another by said integrally molded body.

14. The camshaft according to claim 13, wherein said control contour element is embedded in said integrally molded body to form said at least one adjusting member.

15. A cam pack, comprising:

at least two cams;

at least one adjusting member configured to axially adjust the cam pack on a carrier shaft having an outer toothing;

said cams having an inner toothing configured to engage in an axially displaceable manner with the outer toothing of the carrier shaft;

an integrally molded body interconnecting said cams and said at least one adjusting member in an axially adjacent configuration, said integrally molded body being integrally molded on at least one of said cams and said at least one adjusting member by an original molding process; and a composite structure formed by said integrally molded body and configured for direct configuration on the carrier shaft.

16. A method for producing a camshaft, the method comprising the following steps:

providing a carrier shaft configured to be mounted for rotation along a shaft axis and having an outer toothing;

providing at least one cam pack including at least two cams and at least one adjusting member configured to axially adjust the at least one cam pack;

placing the at least one cam pack axially displaceably on the carrier shaft;

placing at least two of the cams in a position adjacent the at least one adjusting member;

integrally molding a body on at least one of the cams and the at least one adjusting member by an original molding process, forming a composite structure including the at least one cam and the at least one adjusting member;

placing the composite structure directly on the carrier shaft; and providing the cams with an inner toothing engaged in an axially displaceable manner with the outer toothing of the carrier shaft.

17. The method according to claim 16, which further comprises:

forming a plurality of the cams into at least one multiple cam element; and connecting the at least one multiple cam element to the at least one adjusting member in an axially adjacent configuration using the integrally molded body.

18. The method according to claim 17, which further comprises providing the integrally molded body as a part of the at least one adjusting member.

19. The method according to claim 17, which further comprises:

introducing at least one of the at least one cam or the at least one multiple cam element and the at least one adjusting member into an original molding tool in an axially adjacent configuration with respect to one another; and then casting the integrally molded body using a casting process into a hollow space bordered by the original molding tool, the at least one cam or the at least one multiple cam element and the at least one adjusting member.

* * * * *